United States Patent [19]

Sakurai

[11] Patent Number: 5,051,851
[45] Date of Patent: Sep. 24, 1991

[54] METHOD AND APPARATUS FOR POSITIONING HEAD ON THE BASIS OF PREMEASURED AMOUNT OF DISPLACEMENT

[75] Inventor: Tetsuji Sakurai, Oome, Japan

[73] Assignee: Kabushiki Kaisha Toshiba, Kawasaki, Japan

[21] Appl. No.: 443,216

[22] Filed: Nov. 30, 1989

[30] Foreign Application Priority Data

Nov. 30, 1988 [JP] Japan .................................. 63-300910

[51] Int. Cl.⁵ .............................................. G11B 5/596
[52] U.S. Cl. ................................ 360/77.06; 360/77.08; 360/78.04
[58] Field of Search ............... 360/77.01, 77.02, 77.05, 360/77.06, 77.07, 77.08, 78.01, 78.04

[56] References Cited

U.S. PATENT DOCUMENTS 4,827,362 5/1989 Baba ............................. 360/77.06 X
4,964,009 10/1990 Moriya et al. ............... 360/77.08 X

OTHER PUBLICATIONS

"Digital Magnetic Recording Technology", (Tiriceps Co., Ltd.), Jan. 29, 1986.

Primary Examiner—John H. Wolff
Attorney, Agent, or Firm—Cushman, Darby & Cushman

[57] ABSTRACT

The magnetic disk apparatus having improved tracking performance, includes a head for accessing a magnetic disk which is rotated, a displacement detector, a head position controller, a table and a controller. The displacement detector detects an amount of displacement of the head from a designated track of the magnetic disk, based on a signal through the head from servo data associated with the designated track and generating displacement data from the displacement amount. The head position controller controls a position of the head in a radial direction of the magnetic disk in response to an input position control instruction. The table stores a plurality of disk-dependent displacement data. The controller reads out disk-dependent displacement data from the table in accordance with the designated track and outputting the position control instruction to the head position controller in accordance with the displacement data from the displacement detector and the disk-dependent displacement data.

18 Claims, 4 Drawing Sheets

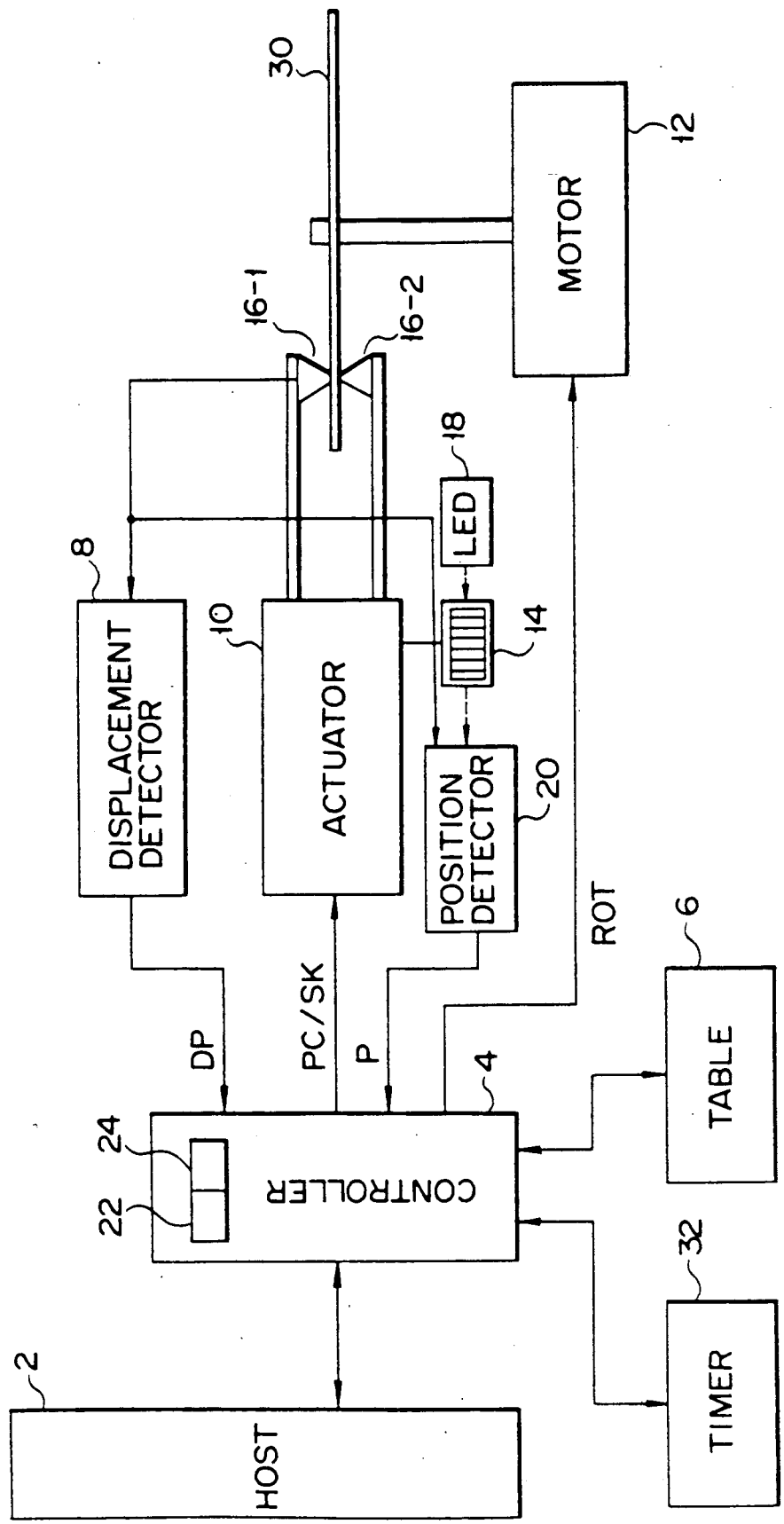
F I G. 2

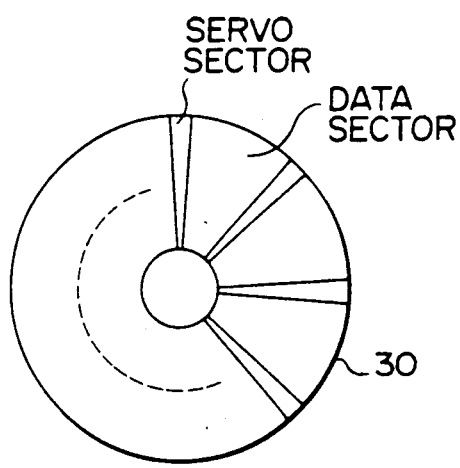
F I G. 3
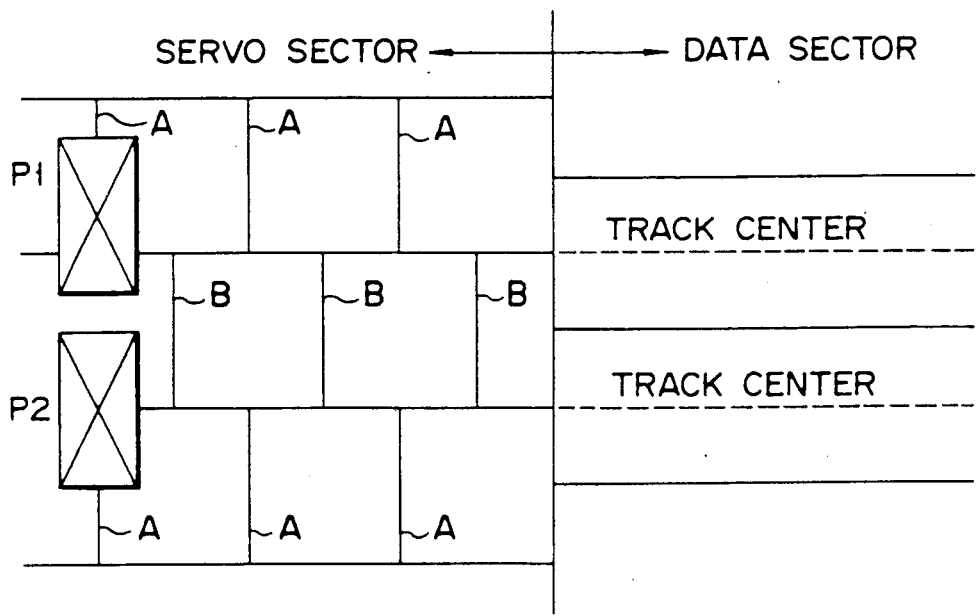
F I G. 4
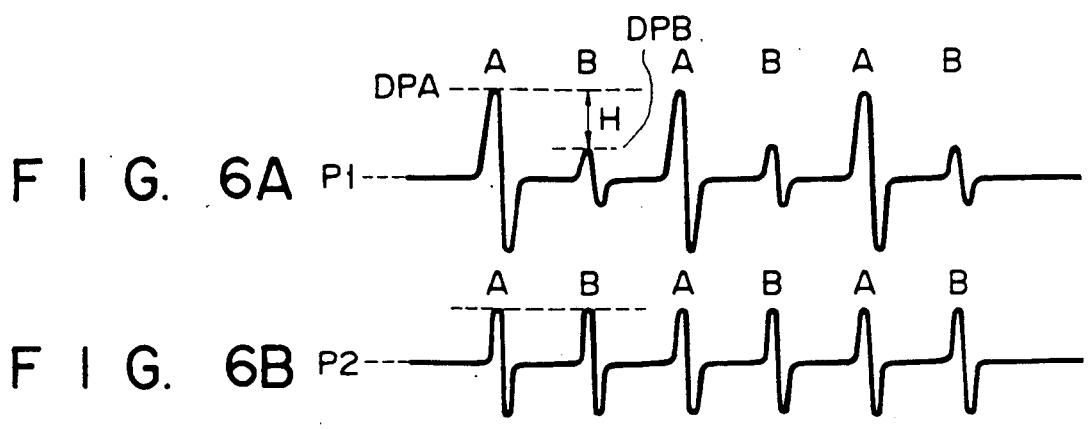
F I G. 6A
F I G. 6B

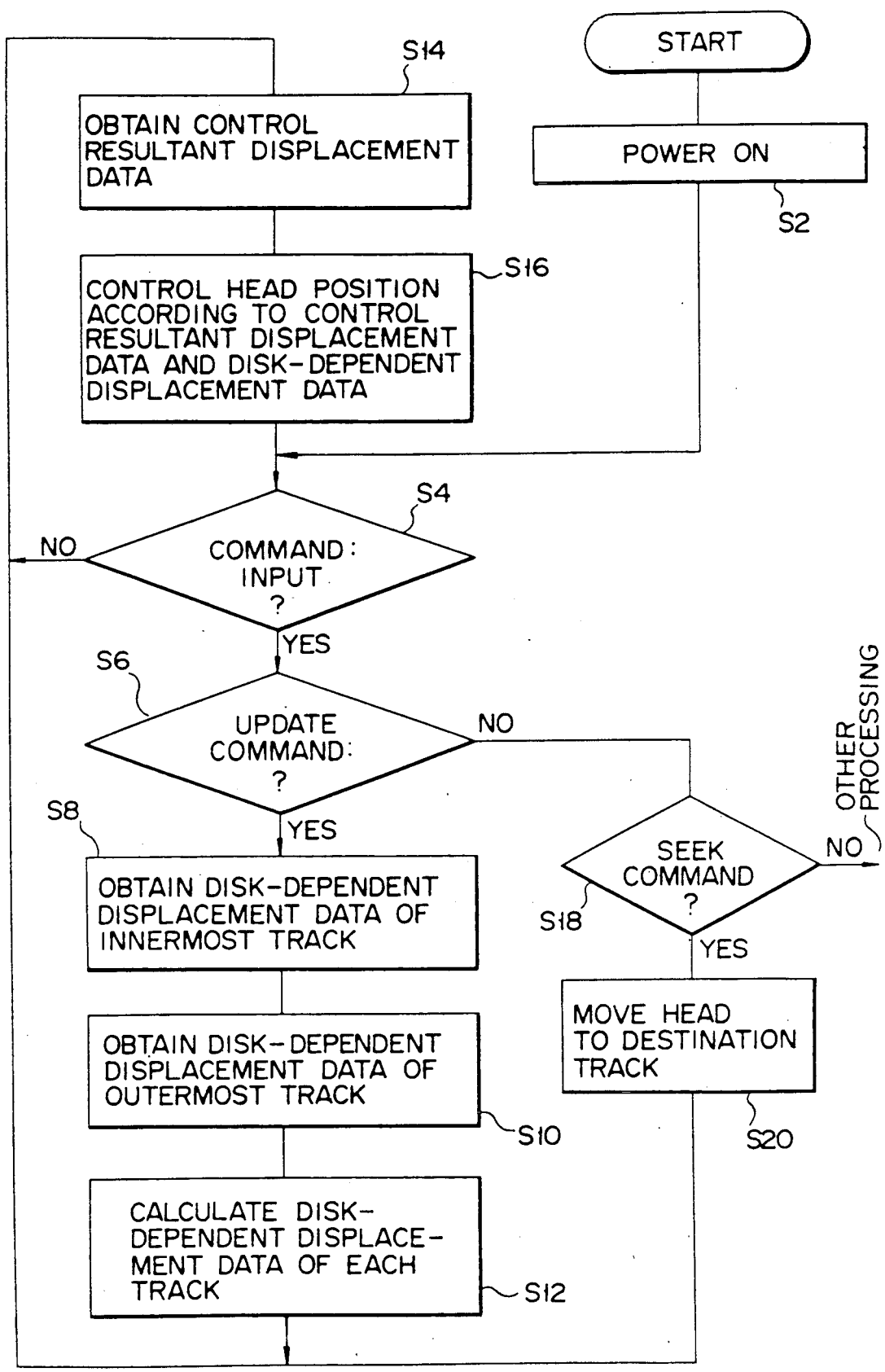
F I G. 5

METHOD AND APPARATUS FOR POSITIONING HEAD ON THE BASIS OF PREMEASURED AMOUNT OF DISPLACEMENT

BACKGROUND OF THE INVENTION

1. Field of the Invention

The present invention relates to a method and apparatus for positioning a head on the basis of a premeasured amount of displacement.

2. Description of the Related Art

Disks used in magnetic disk apparatuses include a floppy disk and a hard disk. The hard disk has a thermal offtrack problem. The floppy disk has a humidity offtrack problem and a problem of eccentricity at the time of disk change, as well as the thermal offtrack problem. Therefore, it is technically very important to position a head to a destination track at high speed with high precision. For this purpose, servo data is written in the disk. The servo data are classified into dedicated servo data, sector servo data, and index servo data in accordance with schemes for writing the servo data.

In a conventional servo disk apparatus, servo data is read out from a disk and tracking control is performed in accordance with an amount of displacement upon detection of displacement derived from the servo data. That is, closed loop positioning control is performed. For example, in a case where an intermittent servo scheme such as a sector or index servo scheme is employed, the head position is adjusted in accordance with an amount of displacement derived from servo data of the current head position while the head is moved from the current head position to a position at which the next servo data is written. In a continuous servo scheme such as the dedicated servo scheme, servo data can be continuously obtained. This scheme has higher precision than the intermittent servo scheme, but is in fact the closed loop positioning control. The above problem will be described by exemplifying the sector servo scheme with reference to FIG. 1. When a displacement d1 is detected at a given sector, the head position is controlled to compensate for the displacement d1. However, when a disk-dependent displacement d2 is present, this displacement cannot be eliminated.

In the conventional control scheme, tracking control is performed in accordance with the detected amount of displacement. Therefore, if anisotropic variations such as eccentricity are present, the tracking operation is markedly delayed for a medium such as a floppy disk, or accurate tracking cannot be performed, resulting in inconvenience.

SUMMARY OF THE INVENTION

The present invention has been made in consideration of the above problems, and has as its object to provide a method and apparatus for positioning a head based on a premeasured amount of displacement so as to perform open loop control coping with accurate, high-speed tracking even if displacements dependent on the disk itself, i.e., anisotropic variations are present.

In order to achieve the object, the magnetic disk apparatus having improved tracking performance, includes a head for accessing a magnetic disk which is rotated, a displacement detector, a head position controller, a table and a controller. The displacement detector detects an amount of displacement of the head from a designated track of the magnetic disk, based on a signal through the head from servo data associated with the designated track and generating displacement data from the displacement amount. The head position controller controls a position of the head in a radial direction of the magnetic disk in response to an input position control instruction. The table stores a plurality of disk-dependent displacement data. The controller reads out disk-dependent displacement data from the table in accordance with the designated track and outputting the position control instruction to the head position controller in accordance with the displacement data from the displacement detector and the disk-dependent displacement data.

In order to achieve the object, in a magnetic disk apparatus, a method of improving tracking performance, includes the steps of:

detecting an amount of displacement of a head from a designated track of the magnetic disk, based on a signal through said head from servo data associated with the designated track to generate resultant displacement data from the displacement amount, the magnetic disk being rotated;

detecting a position of said head in a rotation direction of the magnetic disk;

reading out track-dependent displacement data from a table in accordance with the designated track and the detected position of said head, said table storing a plurality of track-dependent displacement data with respect to positions of the head; and controlling a position of said head in a radial direction of the magnetic disk in accordance with the track-dependent displacement data and the resultant displacement data.

As described above, according to the present invention, displacements dependent on the disk, e.g., anisotropic variations are present, accurate, high-speed tracking can be performed. That is, positioning control of the head is performed on the basis of a premeasured amount of displacement. Therefore, the present invention is especially effective to high-density recording disks.

BRIEF DESCRIPTION OF THE DRAWINGS

FIG. 2 is a block diagram showing an arrangement of a disk apparatus according to an embodiment of the present invention;

FIG. 3 is a view showing layout of servo areas on a disk used in the disk apparatus of the present invention;

FIG. 4 is a view showing a state of servo and data areas shown in FIG. 3;

FIG. 5 is a flow chart for explaining an operation of the embodiment;

FIGS. 6A and 6B are waveform charts of signals obtained from a servo pattern on the basis of a head position.

DETAILED DESCRIPTION OF THE PREFERRED EMBODIMENTS

Figure 1:
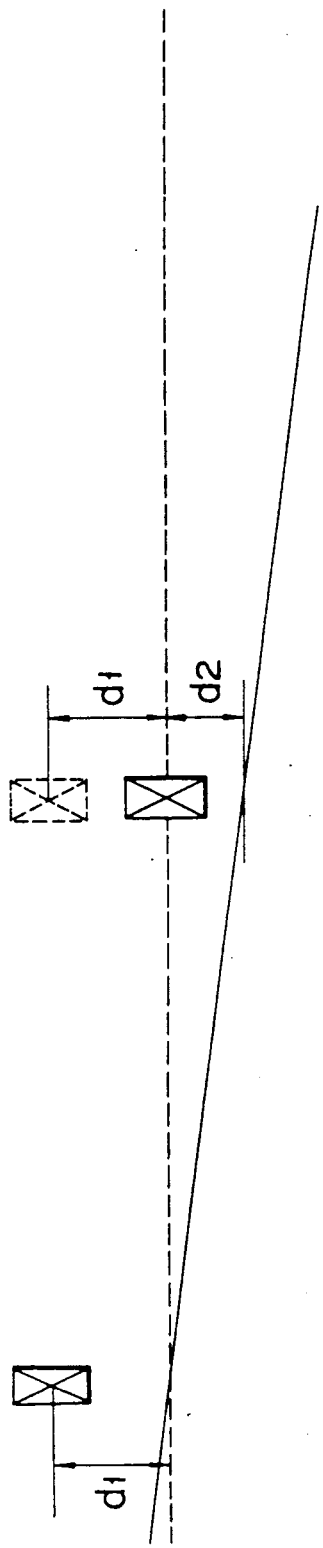
FIG. 1 is a view for explaining tracking control of a head in a conventional disk apparatus.

A disk apparatus according to the present invention will be described in detail with reference to the accompanying drawings.

A disk apparatus according to an embodiment of the present invention will be described with reference to FIG. 2. A controller 4 controls the overall operation of the disk apparatus. The controller 4 is connected to a host 2, a timer 32, and a table 6. The host 2 outputs various commands and various data to the controller 4. In particular, when a power switch is turned on, an update command is supplied from the host 2 to the controller 4. The controller 4 outputs various instruction signals to the respective parts (to be described below) in response to commands from the host 2. In addition, the controller 4 outputs a busy signal to the host 2 during measurement of a disk-dependent displacement in response to the update command.

The timer 32 measures a predetermined period of time. When the predetermined period of time has elapsed, the timer 32 outputs an update command to the controller 4. The table 6 stores disk-dependent displacement data used for positioning control of the head by the controller 4. This data is displacement data depending on the disk in association with track and sector positions.

The controller 4 outputs a rotation instruction signal ROT to a motor 12 in accordance with a command from the host 2, and the motor 12 drives to rotate a disk 30 set in the disk apparatus. The disk 30 may be a floppy or hard disk. In this embodiment, the disk 30 is assumed to be a 16 MB type floppy disk. The disk 30 is a sector servo floppy disk, as shown in FIG. 3. The present invention can also be applied to the index servo scheme, which will be apparent from the following description. A given servo sector and a given data sector of the disk 30 are shown in FIG. 4. Patterns A and B are alternately written in the servo sectors in units of tracks.

A displacement detector 8 digitizes peak values DPA and DPB of the patterns A and B read out from the given servo sector of the disk 30 by a head 16-1 or 16-2 of a pair of heads 16 and outputs the digital peak values to the controller 4 as a data signal DP. The controller 4 generates displacement data from the values DPA and DPB. The controller 4 comprises a register 22 for storing a track number representing the current state of the head 16, and a register 24 for storing a sector number. When the head 16 is moved relative to the disk 30, the contents of the registers 22 and 24 are updated. In a position control loop, the controller 4 refers to the table 6 in accordance with the contents of the registers 22 and 24 and reads out disk-dependent displacement data of a servo sector next to the one designated by the content of the register 24 representing the track on which the head 16 is currently located. The controller 4 generates a position control instruction signal PC in accordance with the readout disk-dependent displacement data and the detected displacement data and outputs the signal PC to an actuator 10. The actuator 10 moves the heads 16-1 and 16-2 along the disk 3 to accurately position them onto the destination track in response to the instruction signal PC. When an operation is performed in response to the update command, the controller 4 outputs a seek instruction signal SK to the actuator 10.

The actuator 10 includes a voice coil motor (not shown) and controls the position of the heads 16 in accordance with the position control instruction signal PC, i.e., a control current. A gage 14 is mounted on the actuator 10. The gage 14 is moved and interlocked with the heads 16-1 and 16-2. The position detector 20 receives a signal from the head 16-1 or 16-2 and a light beam emitted from an LED 18 onto the gage 14 and outputs a detection signal P to the controller 4. During an operation in response to the update command, the LED 18 and the gage 14 are used in the position detection, and the controller 4 detects on the basis of the signal P from the detector 20 that the head 16 has sought the innermost or outermost track.

An operation of the disk apparatus according to the present invention will be described with reference to FIG. 5.

In step S2, when a power switch of the apparatus is turned on, the rotation instruction signal ROT of the disk 30 is output to the motor 12 in response to a command from the host 2, and then the disk 30 is rotated. Thereafter, the host 2 outputs an update command to the controller 4. The controller 4 determines in step S4 whether a command is input. Since the input command is the update command, the flow advances to step S8 via step S6.

In step S8, the controller 4 generates the seek instruction signal SK for moving the heads to a first predetermined position, e.g., the innermost track. A seek control current as the seek instruction signal SK is supplied to the actuator 10. The heads 16-1 and 16-2 (these heads are referred to as heads 16 hereinafter) are moved toward the innermost track. At this time, during the movement of the heads 16, the content of the register 22 is updated on the basis of the signal P to a value representing a position at which the heads 16 are present. When the position detector 20 detects from light from the LED 18 through the gage 14 that the heads 16 have reached the first predetermined position of the floppy disk, the seek instruction SK is disabled, and a current for the positioning control without use of disk-dependent displacement data flows through a coil of the voice coil motor. Therefore, the heads 16 are almost stopped at the predetermined radial position. A track width is about 38 μm in the 16 MB type floppy disk and positional fluctuation at the first predetermined position is negligibly about 2 μm.

Since the disk 30 is being rotated, a signal corresponding to servo data written in each servo sector is supplied to the displacement detector 8 through, for example, the head 16-1. At this time, during rotation of the disk 30, the content of the register 24 is updated to represent a servo sector position at which the heads 16 are currently located. For example, when the head 16-1 is located at a position Pl, as shown in FIG. 4, the corresponding signal supplied to the detector 8 is shown in FIG. 6A. At this time, the head 16-1 is displaced to the pattern A side, a peak value of a signal corresponding to the pattern A is larger than that corresponding to the pattern B. The detector 8 sequentially digitizes peak values and outputs the result and digital data DPA and DPB to the controller 4. The controller 4 generates displacement data in accordance with the peak data DPA corresponding to the pattern A and the peak data DPB corresponding to the pattern B. That is, a calculation (DPA−DPB) is performed. In this manner, the disk-dependent displacement data has a sign. The controller 4 generates the disk-dependent displacement data for each servo sector as described above. Thereafter, step S10 is executed.

In step S10, the controller 4 generates the seek instruction signal SK for moving the heads to a second predetermined position, e.g., the outermost track. This instruction is output to the actuator 10, and the heads 16 are moved toward the second predetermined position. The subsequent operations are the same as in head movement toward the innermost track, thereby generating disk-dependent displacement data corresponding to each servo sector. Step S12 is then executed.

In step S12, a difference between the displacement data at the outermost track and the displacement data at the innermost track is calculated for all the servo sectors. In order to calculate a displacement per track, the difference is divided by the number of tracks present between the outermost and innermost tracks. The disk-dependent displacement data of the nth intermediate track is obtained by adding a value obtained by multiplying the displacement per track by n, to the displacement data at the innermost track. In this manner, when the disk-dependent displacement data of all tracks in all servo sectors are calculated, these data are written in the table 6. Thereafter, steps S14 and S16 are executed.

When the seek command is output from the host 2 to the controller 4, step S18 is executed after steps S4 and S6. The controller 4 determines in step S18 whether an input command is a seek command. If YES in step S18, step S20 is executed. Otherwise, another processing is executed. In step S20, the seek instruction signal SK is output from the controller 4 to the actuator 10 so that the heads 16 seek a destination track. When the heads reach the destination track, position control in steps S14 and S16 is performed.

Figure 7:
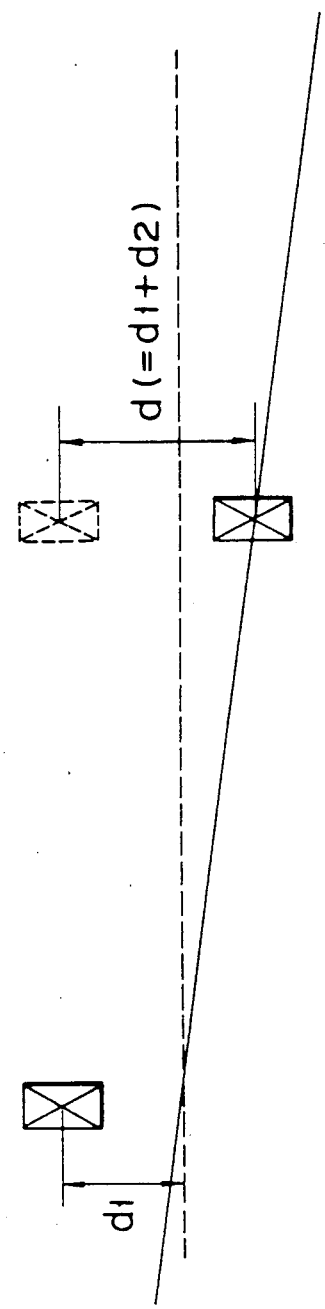
FIG. 7 is a view for explaining adjustment of a head position in the embodiment.

In step S14, as shown in FIG. 7, control resultant displacement data d1 at a given servo sector is calculated in the same manner as described above. In step S16, the table 6 is referred to in accordance with the contents of the registers 22 and 24, and disk-dependent displacement data d2 corresponding to a next servo sector of the destination track is read out. The disk-dependent displacement data d2 is added to the control resultant displacement data d1, and the sum d is output as the position control instruction signal PC from the controller 4 to the actuator 10. Therefore, when the heads 16 reach the next servo sector, the head center is located at the track center, as indicated by a position P2 in FIG. 4. At this time, the control resultant displacement data is "0", as shown in FIG. 6B. Thereafter, position control is performed in steps S14 and S16, as shown in FIG. 6B.

When an update command is input from the timer 32 during position control, the controller 4 outputs a busy signal to the host 2, and the controller 4 updates the contents of the table 6 in processing of steps S8 to S12.

In this manner, even if a disk-dependent displacement is present in the disk, the heads can trace the destination track with high precision.

In the above description, the disk is exemplified as a floppy disk. However, the disk may be a hard disk. Since the dedicated servo scheme is generally employed in the hard disk, servo data are sampled to obtain an appropriate number of samples in the controller 4.

In the above embodiment, the tracks used for the update command are the innermost and outermost tracks, but are not limited to these.

In the above embodiment, the displacement data is obtained by the first pair of data of the patterns A and B. However, the displacement data may be obtained by using an average value of the peak data corresponding to the pattern written in each servo sector. This arrangement can further improve precision.

In the above embodiment, the actuator 10 includes a voice coil motor. However, a stepping motor and the like may be used to arrangement the actuator 10. In this case, the LED 18, the gage 14, and a light-receiving section of the position detector 20 can be omitted, since the stepping motor can be stopped at any track position.

What is claimed is:

1. A magnetic disk apparatus having improved tracking performance, comprising:
   a head for accessing a magnetic disk, the magnetic disk being rotated;
   displacement detection means for detecting an amount of displacement of said head from a designated track of the magnetic disk, based on a signal through said head from servo data associated with the designated track and generating displacement data from the displacement amount;
   head position control means for controlling a position of said head in a radial direction of the magnetic disk in response to an input position control instruction;
   table for storing a plurality of disk-dependent displacement data; and
   control means for reading out disk-dependent displacement data from said table in accordance with the designated track and outputting the position control instruction to said head position control means in accordance with the displacement data from said displacement detection means and the disk-dependent displacement data.

2. An apparatus according to claim 1, further comprising:
   update means responsive to an input update command, for inhibiting said control means from generating the position control instruction, causing said head to seek a first track of the magnetic disk, receiving the displacement data as first displacement data from said displacement detection means when said head positions on the first track, causing said head to seek a second track of the magnetic disk, receiving the displacement data as second displacement data from said displacement detection means when said head positions on the second track, and calculating the plurality of disk-dependent displacement data for tracks of the magnetic disk from the first and second displacement data to write the plurality of disk-dependent displacement data in said table.

3. An apparatus according to claim 2, further comprising timer means for outputting the update command to said update means every predetermined time period.

4. An apparatus according to claim 2, further comprising means for outputting the update command to said update means when the apparatus is powered on.

5. An apparatus according to claim 1, wherein the servo data includes two types of patterns, said displacement detection means detects the displacement amount from a difference between first and second signals respectively corresponding to the patterns through said head.

6. An apparatus according to claim 1, wherein the magnetic disk is of a dedicated servo system, and said control means outputs the position control instruction to said head position control means when said head is located at predetermined positions of the designated track.

7. An apparatus according to claim 1, wherein the magnetic disk is of one of a sector servo system and an index servo system.

8. In a magnetic disk apparatus, a method of improving tracking performance, comprising the steps of:
   detecting an amount of displacement of a head from a designated track position of the magnetic disk, based on a signal through said head from servo data associated with the designated track, to generate resultant displacement data from the displacement amount, the magnetic disk being rotated;

detecting a position of said head in a rotation direction of the magnetic disk;

reading out track-dependent displacement data from a table in accordance with the designated track position and the detected position of said head, said table storing a plurality of track-dependent displacement data with respect to positions of the head; and controlling a position of said head in a radial direction of the magnetic disk in accordance with the track-dependent displacement data and the resultant displacement data.

9. A method according to claim 8, further comprising:

inhibiting said control operation of a position of said head; and calculating in response to a update command, the plurality of track-dependent displacement data for tracks of the magnetic disk from the resultant displacement data when said head positions on a first track of the magnetic disk and when said head positions on a second track of the magnetic disk, to update the plurality of disk displacement data in said table.

10. A method according to claim 9, further comprising generating the update command every predetermined time period.

11. A method according to claim 9, further comprising generating the update command when the apparatus is powered on.

12. A method according to claim 8, wherein the servo data includes two types of patterns, said detecting of the displacement amount includes detecting the displacement amount from a difference between first and second signals respectively corresponding to the patterns through said head.

13. A method according to claim 8, wherein the magnetic disk is of a dedicated servo system, and said control step further comprises sampling the resultant displacement data in accordance with the detected position of said head.

14. A method according to claim 8, wherein the magnetic disk is of a sector servo system or of an index servo system.

15. A magnetic disk apparatus having improved tracking performance, comprising:

actuator means having a head for accessing a magnetic disk, the magnetic disk being rotated;

displacement detection means for detecting an amount of displacement of said head from a designated track of the magnetic disk, based on a signal through said head from servo data associated with the designated track and generating displacement data from the displacement amount;

driving means for driving said actuator means to position said head on the designated track in a radial direction of the magnetic disk in response to an input position control instruction;

table for storing disk-dependent displacement data;

control means for reading out the disk-dependent displacement data from said table and outputting the position control instruction to said driving means in accordance with the displacement data from said displacement detection means and the disk-dependent displacement data.

16. An apparatus according to claim 15, further comprising:

update means responsive to an input update command, for inhibiting an operation of said control means, sequentially causing said head to seek first and second tracks, and calculating the disk-dependent displacement data from the displacement data when said head positions on the first track of the magnetic disk and when said head positions on the second track of the magnetic disk, to update the disk-dependent displacement data in said table.

17. An apparatus according to claim 16, further comprising means for generating the update command every predetermined time period.

18. An apparatus according to claim 16, further comprising means for generating the update command when the apparatus is powered on.

* * * * *